United States Patent
Herrera

(10) Patent No.: US 12,127,641 B1
(45) Date of Patent: Oct. 29, 2024

(54) WATCH HAVING A RELEASE MECHANISM

(71) Applicant: Apple Inc., Cupertino, CA (US)

(72) Inventor: Antonio F. Herrera, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 60 days.

(21) Appl. No.: 18/091,248

(22) Filed: Dec. 29, 2022

Related U.S. Application Data

(63) Continuation of application No. 16/357,118, filed on Mar. 18, 2019, now Pat. No. 11,571,048.

(60) Provisional application No. 62/782,258, filed on Dec. 19, 2018.

(51) Int. Cl.
| | | |
|---|---|---|
| *A44C 5/20* | (2006.01) | |
| *A44C 5/00* | (2006.01) | |
| *A44C 5/14* | (2006.01) | |
| *F16B 1/00* | (2006.01) | |
| *G04B 37/00* | (2006.01) | |
| *G04B 37/18* | (2006.01) | |
| *G04B 47/06* | (2006.01) | |
| *H04N 23/54* | (2023.01) | |

(52) U.S. Cl.
CPC .............. *A44C 5/14* (2013.01); *A44C 5/0053* (2013.01); *A44C 5/2019* (2013.01); *F16B 1/00* (2013.01); *G04B 37/0008* (2013.01); *G04B 47/06* (2013.01); *G04B 47/063* (2013.01); *H04N 23/54* (2023.01); *F16B 2200/83* (2023.08)

(58) Field of Classification Search
CPC ... A44C 5/0023; A44C 5/0007; A44C 5/0015; A44C 5/14; A44C 5/147; A44C 5/0053; A44C 5/2019; A44C 5/2076; A44C 5/20; G04B 37/1486; A44B 11/26; A44B 11/266
USPC .................................................. 24/573.11, 193
See application file for complete search history.

(56) References Cited

U.S. PATENT DOCUMENTS

| | | | | |
|---|---|---|---|---|
| 5,103,771 | A | * | 4/1992 | Lee ....................... A01K 27/005 119/776 |
| 5,197,410 | A | * | 3/1993 | Wilson .................... F16B 45/04 119/776 |
| 5,914,913 | A | | 6/1999 | Shriqui |
| 6,230,663 | B1 | * | 5/2001 | Welch .................. A01K 27/005 119/776 |

(Continued)

FOREIGN PATENT DOCUMENTS

| | | |
|---|---|---|
| CN | 204883168 | 12/2015 |
| EP | 1995651 | 11/2008 |

(Continued)

OTHER PUBLICATIONS

Apple Watch UB Pro Wristband Case (38mm) SupCase.com, retrieved on Jan. 17, 2019 from https://www.supcase.com/apple-watch-series-3-38mm-ubpro-case, 5 pages.

*Primary Examiner* — Jack W Lavinder
(74) *Attorney, Agent, or Firm* — BAKERHOSTETLER

(57) ABSTRACT

A watch can include a watch band having a first strap segment, a second strap segment, a nest portion secured between the first strap segment and the second strap segment, and an opening extending through the nest portion. The watch can further include a housing releasably mountable to the nest portion, and a sensor disposed within the housing and configured to align with the opening when the housing is mounted to the nest portion.

20 Claims, 12 Drawing Sheets

(56) References Cited

U.S. PATENT DOCUMENTS

| | | | |
|---|---|---|---|
| 7,448,116 B1* | 11/2008 | Howell | A44B 11/2592 |
| | | | 24/615 |
| 7,828,180 B2* | 11/2010 | Slesar | F41C 23/02 |
| | | | 224/601 |
| 8,074,326 B2* | 12/2011 | Slank | A01K 27/005 |
| | | | 244/151 A |
| 8,196,273 B2* | 6/2012 | Anscher | A44B 11/266 |
| | | | 24/615 |
| 9,038,251 B1* | 5/2015 | Bevilacqua | A44B 11/266 |
| | | | 24/615 |
| 9,354,023 B1* | 5/2016 | Rittenhouse, Jr. | F41H 1/02 |
| 9,743,719 B2* | 8/2017 | Bevilacqua | A44B 11/266 |
| 9,913,591 B2 | 3/2018 | Lapetina | |
| 10,058,149 B1 | 8/2018 | Wittenberg et al. | |
| 11,156,965 B1 | 10/2021 | Trapero Martin | |
| 2006/0198248 A1 | 9/2006 | Man | |
| 2010/0313392 A1* | 12/2010 | Anscher | A44B 11/266 |
| | | | 24/616 |
| 2012/0087215 A1 | 4/2012 | Fantoni | |
| 2012/0111905 A1 | 5/2012 | Bell | |
| 2013/0001263 A1 | 1/2013 | Kai | |
| 2014/0275850 A1 | 9/2014 | Venkatraman | |
| 2016/0011709 A1 | 1/2016 | Nicolas et al. | |
| 2016/0322745 A1 | 11/2016 | Shedletsky et al. | |
| 2017/0000223 A1 | 1/2017 | Kim | |
| 2018/0144113 A1 | 5/2018 | Cho | |
| 2018/0213895 A1 | 8/2018 | Green | |

FOREIGN PATENT DOCUMENTS

| | | |
|---|---|---|
| FR | 1532454 | 7/1968 |
| GB | 2125993 | 3/1984 |

\* cited by examiner

WATCH HAVING A RELEASE MECHANISM

CROSS-REFERENCE TO RELATED APPLICATIONS

This application is a continuation of U.S. application Ser. No. 16/357,118, entitled "WATCH HAVING A RELEASE MECHANISM," filed Mar. 18, 2019, which claims the benefit of U.S. Provisional Application No. 62/782,258, entitled "WATCH HAVING A RELEASE MECHANISM," filed Dec. 19, 2018, the entirety of which is incorporated herein by reference.

TECHNICAL FIELD

The present description relates generally to wearable devices, and more particularly, to, for example, a watch having a release mechanism.

BACKGROUND

Wrist watches and other wearable devices are generally attractive to users due to their portability, aesthetic appeal, or distinct functionalities that they can offer based on their being worn on or secured closely to the body of a user. Recently, advancements have been made in wearable device technologies that allow them to replicate many capabilities of smart phones and other mobile devices, such as internet browsing, or provide capabilities are more unique to the wearable device space, such as health monitoring or fitness tracking. Unfortunately, existing wearable devices remain constrained in the range of functions that they offer or their usability for many desirable functions.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
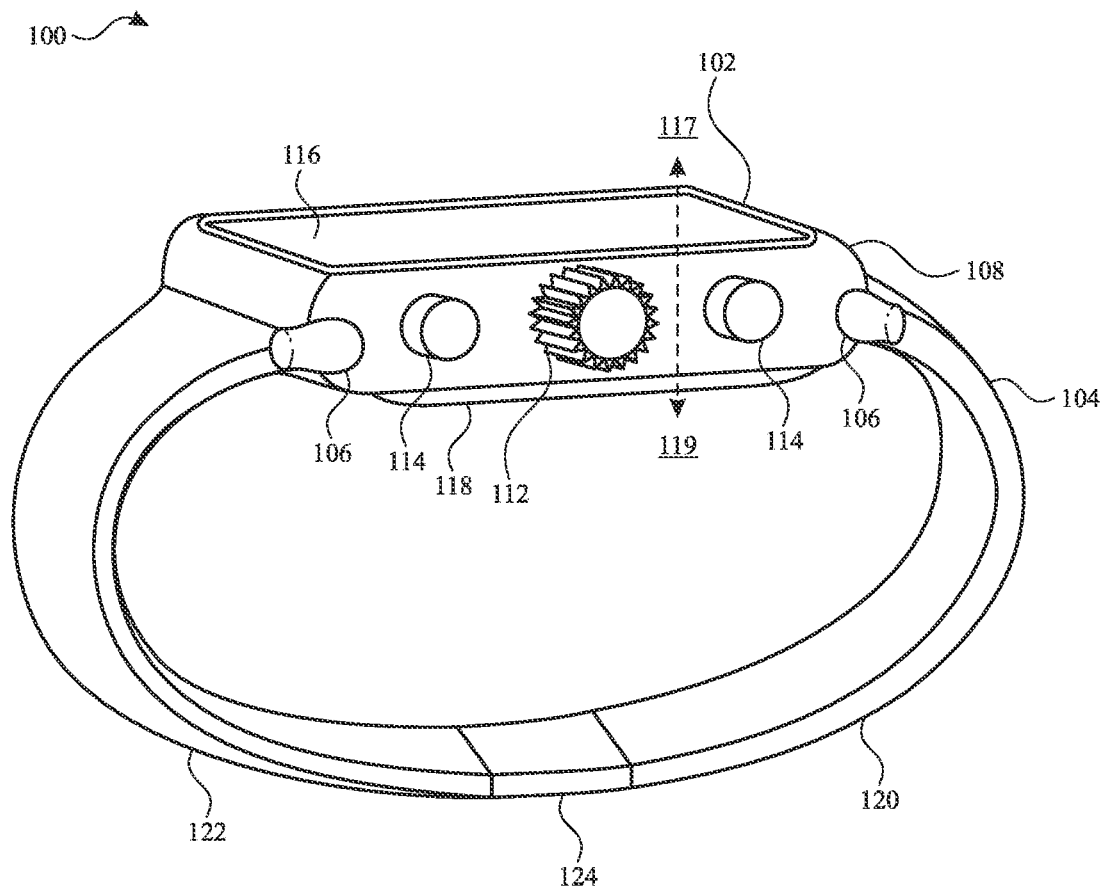
FIG. 1 is a perspective view of a watch, in accordance with some embodiments.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

The following disclosure relates to a watch. According to some embodiments, the watch can have an attachment mechanism that permits quick or ergonomic release of the watch housing or main case body from a user's wrist. This can be useful to, for example, permit sensors such as a camera in the watch housing to be operated while held in a user's free hand or while otherwise removed from the user's wrist. The attachment mechanism of the watch can allow for new or useful functionalities to be integrated in the watch housing that may not be possible or practical to operate while the watch housing is retained on the user's watch. Additionally or alternatively, the attachment mechanism can allow for more quick, ergonomic, or convenient release of the watch or components of the watch from a user's wrist, without a need to operate a clasp, buckle, or closure mechanism that may be relatively more cumbersome to operate or disposed relatively far away from the watch housing (e.g., on an opposite side of the user's wrist).

According to some embodiments, the attachment mechanism may be implemented with a nest-type mechanism in which the watch band can remain wrapped around the user's wrist upon removal of the housing from the user's wrist and/or reattachment of the housing to the user's wrist. The nest mechanism may employ a releasable attachment component, such as a latch, a magnet, or another suitable mechanism for releasably mounting the watch housing to a nest portion of the watch band, in a manner that permits the watch housing to be removed from the nest portion without a need to remove the entire watch band from the wrist or to operate a clasp or buckle disposed on an opposite of the wrist. The nest portion can further include features, such as an opening for sensing therethrough, to facilitate dual functionality of the watch housing in which sensors in the watch housing can take physiological measurements from the user's wrist through the nest portion when the housing is mounted thereto, and in which the same or different sensors can capture images or otherwise interact with an environment external to the watch when the housing is removed from the wrist.

According to some embodiments, a button or other actuator for releasing the attachment mechanism may be disposed on or otherwise proximate to the housing and accessible from an outward-facing surface of the watch to permit operation thereof by a free hand concurrently gripping the housing. This can allow the housing to be decoupled and removed from the user's wrist in one seamless motion. The actuator can be configured to release the housing from a nest portion as described above. Additionally or alternatively, the actuator disposed proximate to the housing can be configured to operate a clasp or other closure mechanism remote from the housing to disconnect an end of the watch strap to permit removal of the watch band together with the housing.

These and other embodiments are discussed below with reference to FIGS. 1-22. However, those skilled in the art will readily appreciate that the detailed description given herein with respect to these Figures is for explanatory purposes only and should not be construed as limiting.

FIG. 1 is a perspective view of an example of a watch 100, in accordance with some embodiments. While embodiments discussed herein are described with reference to a watch, it will be appreciated that the teachings relating to a watch can be applied to various wearable devices. Examples include timekeeping devices, computerized glasses, headphones, head mounted displays, wearable navigation devices, sports devices, accessory devices, health-monitoring devices, medical devices, electronic bracelets and other jewelry.

The watch 100 shown in FIG. 1 is implemented as a wrist-worn device having a housing 102 and a band 104. The band 104 is configured to wrap around a wrist of a user to secure the device in place on the user's body. The band 104 is coupled to the housing 102 to permit the housing 102 to be worn on the user's body together with the band 104.

With reference to FIG. 1, the housing 102 provides a structure that serves to enclose and support one or more internal components of the watch, such as, for example, one or more integrated circuit chips, circuit boards, display devices, batteries, memory devices, sensors, or other functional components. It is contemplated that a housing can in general be implemented as any suitable structure that serves to enclose functional and/or operative components of a device, such as a watch, and that can be directly or indirectly coupled to a band to permit the housing to be worn on the user's body. Although shown in FIG. 1 with a generally rectangular structure providing a rectangular footprint, it is contemplated that the housing 102 can have any appropriate size or shape, such as round, hexagonal, square, or other shapes.

In some embodiments, for example as shown in FIG. 1, the housing 102 can provide main casing assembly or case body that provides an external structural framework of the watch 100 with which the user can directly interact. The housing 102 and each component of the housing 102 can have a top side 117 and a bottom side 119 opposite to the top side 117, which are oriented as generally shown by the dotted line in FIG. 1. As shown in FIG. 1, the housing 102 can include a perimeter sidewall 108 adjoining a top cover 116 and a bottom cover 118. The top cover 116 can be disposed on a top side 117 of the sidewall 108 and a top side 117 of the housing 102, while the bottom cover 118 can be disposed on a bottom side 119 of the sidewall 108 and the housing 102 that is opposite to the top side 117. Internal components can be disposed be disposed in an interior cavity between the top cover 116 and the bottom cover 118, while the sidewall 108 can extend peripherally or circumferentially around the interior cavity and internal components contained therein.

It is contemplated that the top cover 116, bottom cover 118, and sidewall 108 can each be made from discrete components or pieces that are attached or otherwise assembled together. Alternatively, it is contemplated that any two or more of the housing components can be integrally formed from a substantially monolithic structure to provide for the desired enclosure and/or support framework. It is also contemplated that any one of the top cover 116, the bottom cover 118, and the sidewall 108 can be made from multiple discrete pieces, layers, or other components that are attached or otherwise assembled together. In some embodiments, the housing 102 or any one or more parts of the housing 102 can be made from rigid materials. Examples of rigid materials that can be utilized for the housing 102 include glass, ceramics, crystalline materials such as sapphire, aluminum, steel, and/or plastics.

In some embodiments, for example as shown in FIG. 1, one or more external functional components such as input/output (I/O) devices can be supported by or coupled to the housing 102 to allow for manipulation by or other interaction with a user. As used herein, "I/O device" refers to any user interface device or environmental interface device configured to receive input from a user or environment and/or provide output to a user or environment. "Input device" as used herein refers to any I/O device configured to receive input and which may or may not be configured to provide output. "Output device" as used herein refers to any I/O device configured to provide output and which may or may not be configured to receive input.

Referring to FIG. 1 for example, the watch 100 can include one or more buttons 114 disposed externally on or as part of the housing 102. The buttons 114 can, for example, be implemented as mechanical push buttons or touch-sensitive buttons. Additionally or alternatively, the watch 100 can include a rotatable dial 112 disposed externally on the housing 102. The rotatable dial 112 can be disposed rotatably with respect to the sidewall 108, and configured to provide for scrolling, sliding, or user interface (UI) navigation inputs. The dial 112 can be implemented as a digital crown in which mechanical rotation of the dial 112 provides for electronic input functionality to the watch 100. The button 114 and dial 112 are examples of I/O devices configured to interact with a user, and more particularly, are examples of input devices configured to receive input from a user for providing one or more functional inputs to the watch 100. It is contemplated that the I/O devices disposed on or supported by the housing can be positioned on the sidewall 108, as shown in FIG. 1, or positioned in any other suitable location on the housing.

With respect to the example shown in FIG. 1 and the frame of reference of a watch or wrist-worn device, the bottom cover 118 and bottom side 119 correspond to a side of the housing 102 and the watch 100 that faces a wrist of the user when the watch 100 is worn on the wrist. More generally, the bottom cover 118 and the bottom side 119 can face a body part of the user when the wearable device is worn on the body part. The top cover 116 and top side 117 correspond to a side of the housing 102 and the watch that face away from the wrist of the user. More generally, the top cover 116 and the top side 117 can face away from a body part of a user when the wearable device is worn on the body part. A display can be provided to present images or output various graphical information on or through the top side 117 of the housing 102 and through the top cover 116. In some embodiments, the top cover 116 can provide an input surface for a touch-sensitive device included in or overlapping with the display, such as a touch screen interface, force sensing device, and/or a fingerprint sensor. The input surface can, for example, permit a user to interact with graphical user interface (GUI) elements presented on the display. It is also contemplated that other wrist-worn devices can omit a display. Additionally or alternatively, it is contemplated that other I/O devices can be included, such as speakers, microphones, gesture interfaces, motion sensors, cameras, and the like.

The band 104 shown in FIG. 1 is implemented as a wristband that includes a first strap segment 120 and a second strap segment 122. The first strap segment 120 and the second strap segment 122 can generally form portions of the watch band that extend from opposing sides of the housing 102 when the watch band is coupled with the housing 102. The first strap segment 120 can include or be a part of a first discrete band strap, and the second strap segment 122 can include or be a part of a second discrete band strap, where the first band strap and the second band strap are attached to each other via a closure mechanism 124. Alternatively, the first strap segment 120 and the second strap segment 122 can be different portions of a single continuous watch strap.

The closure mechanism 124 can, for example, be implemented as a clasp, a buckle, a magnetic attachment, or any other suitable mechanism for attaching the first strap segment 120 to the second strap segment to close the watch band around the wrist, or for otherwise opening and closing the watch band around the wrist. Each of the first strap segment 120 and the second strap segment 122 can be made from any suitable flexible and/or rigid components that can generally conform to the outer surface of a user's wrist and extend circumferentially around the wrist. Examples include, without limitation, leather, fabrics, rubber, nylon, plastics, and metallic bracelets. It is contemplated that the band 104 can be implemented in numerous different configurations and can generally include any suitable flexible or rigid components that can be removably wrapped around a wrist of a user. For example, in some embodiments the band 104 can utilize a closure mechanism 124 implemented with a single continuous elastic or expandable watch band loop, such that the first strap segment 120 and second strap segment 122 form parts of a continuous watch band strap. Additionally or alternatively, the band 104 can include a sleeve or envelope that overlaps with the housing 102 in whole or in part to couple to the band 104 to the housing and hold the housing 102 in place on the user's wrist. Various other configurations are possible. Likewise, while the band 104 is implemented as a wristband, it will be appreciated that the teachings of the watch band can be applied to other bands that are configured to wrap around other body parts of a user.

The watch 100 can further include an attachment mechanism 106 for securing the housing 102 to the band 104. The attachment mechanism 106 shown in FIG. 1 includes multiple attachment regions, and in particular, includes an attachment region on one side of the housing 102 (e.g., a top side when the housing 102 is viewed in plan view) and another attachment region on an opposing side of the housing 102 (e.g., a bottom side when the housing 102 is viewed in plan view) to connect the first strap segment 120 to the housing 102 and the second strap segment 122 to the housing 102, respectively. The attachment mechanism 106 can include, for example, a slot, a lug, a threaded fastener, or any other suitable component to connect the band 104 to the housing 102. In some embodiments, the attachment mechanism 106 can provide for a latch, button, magnetic coupling, and/or other mechanism that releasably attaches the band 104 to the housing 102 to permit a user to easily remove the housing 102 from and reattach the housing 102 to the band 104 without a need for special tools. Although multiple attachment regions are shown in FIG. 1, it is contemplated that other implementations can utilize more attachment regions or a single attachment region for connecting the band 104 to the housing 102. Although the attachment mechanism 106 is shown disposed on the sidewall 108 in FIG. 1, it is contemplated that the attachment mechanism 106 can disposed on or coupled to any other feasible location on the housing 102.

Figure 2:
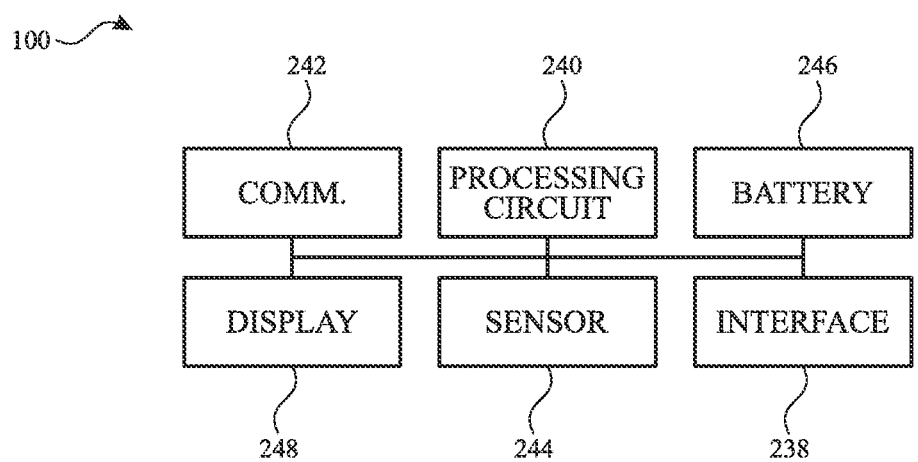
FIG. 2 is a block diagram of a watch, in accordance with some embodiments.

FIG. 2 shows a block diagram of watch 100 showing various functional components that may, for example, be housed within the housing 102, in accordance with some embodiments. The watch 100 can further include one or more other user interfaces 238 for receiving input from and/or providing output to a user. For example, one or more buttons, dials, crowns, switches, or other devices can be provided for receiving input from a user. The user interface 238 can include a speaker, a microphone, and/or a haptic device. A haptic device can be implemented as any suitable device configured to provide force feedback, vibratory feedback, tactile sensations, and the like. For example, in one embodiment, the haptic device may be implemented as a linear actuator configured to provide a punctuated haptic feedback, such as a tap or a knock. According to some embodiments, the user interface(s) 238 can include or cooperate with any one or more of the I/O devices described above, such as the dial 112, the button(s) 114, and/or the display.

As further shown in FIG. 2, the watch 100 can include one or more processing circuit(s) 240 (referred to generally herein as processing circuitry) that is/are configured to perform one or more functions for the watch 100. By way of example, the processing circuitry can include one or more microprocessors, microcontrollers, field programmable gate arrays (FPGAs), application-specific integrated circuits (ASICs) such as I/O controller ICs, central processing units (CPUs), graphics processing units (GPUs), digital signal processors (DSPs), discrete circuit elements, and/or other suitably configured electronic circuitry or computing elements. In particular embodiments, the processing circuitry 240 can include, for example, one or more light emitting diode (LED) drivers, image sensor controllers, readout integrated circuits (ROIC), display driver ICs, host processors, and/or other suitable configured circuitry configured to control, process signals from, or otherwise cooperate with one or more I/O devices or I/O device controllers.

The processing circuitry can include or be configured to access a memory having instructions stored thereon. The instructions or computer programs may be configured to perform one or more of the operations or functions described with respect to the watch 100. The processing circuitry 240 can be implemented as an electronic device capable of processing, receiving, or transmitting data, signals, or instructions. As described herein, the term "processing circuitry" is meant to encompass a single processor or processing unit, a single integrated circuit, multiple processors, multiple integrated circuits, multiple processing units, or other suitably configured computing element or elements. The memory can store electronic data that can be used by the watch 100. For example, a memory can store electrical data or content such as, for example, audio and video files, documents and applications, device settings and user preferences, timing and control signals or data for the various modules, data structures or databases, and so on. The memory can be configured as any type of memory. By way of example only, the memory can be implemented as random access memory, read-only memory, Flash memory, removable memory, or other types of storage elements, or combinations of such devices.

As further shown in FIG. 2, the watch 100 may include a communication component 242 that facilitates transmission of data and/or power to or from other electronic devices across standardized or proprietary protocols. For example, a communication component 242 can transmit electronic signals via a wireless and/or wired network connection. Examples of wireless and wired network connections include, but are not limited to, cellular, Wi-Fi, Bluetooth, infrared, RFID and Ethernet.

As further shown in FIG. 2, the watch 100 may also include one or more sensors 244, such as biosensors, physiological sensors, and/or cameras positioned substantially anywhere on the watch 100. The one or more sensors 244 may be configured to receive substantially any type of information such as, but not limited to, images, pressure, light, touch, force, temperature, position, motion, and so on. For example, the sensor(s) 244 may be a photodetector, a temperature sensor, a light or optical sensor, an atmospheric pressure sensor, a humidity sensor, a magnet, a gyroscope, an accelerometer, and so on. The sensor(s) 244 can include one or more health sensors, which can be disposed on or configured to sense through a bottom side 119 of the watch 100, such as sensor(s) disposed on or near the bottom cover 118. The one or more sensors 244 can include optical and/or electronic biometric sensors that may be used to compute one or more physiological characteristics. A sensor 244 can include a light source and a photodetector to form a photoplethysmography (PPG) sensor. Light can be transmitted from the sensor 244, to the user, and back to the sensor 244. For example, the bottom cover 118 or other part of the housing 102 can provide one or more windows (e.g., transmission medium, and/or lens) to transmit light to and/or from the sensor 244. The optical (e.g., PPG) sensor or sensors may be used to compute various physiological characteristics including, without limitation, a heart rate, a respiration rate, blood oxygenation level, a blood volume estimate, blood pressure, or a combination thereof. One or more of the sensors 244 may also be configured to perform an electrical measurement using one or more electrodes. Additionally or alternatively, a sensor 244 can be configured to measure body temperature, exposure to UV radiation, and other health-related information.

As further shown in FIG. 2, the watch 100 may include a battery 246 that is used to store and provide power to the other components of the watch 100. The battery 246 may be a rechargeable power supply that is configured to provide power to the watch 100. The watch 100 may also be configured to recharge the battery 246 using a wireless charging system using, for example, an electromagnetic device such as an inductive charging coil.

As further shown in FIG. 2, the watch 100 can include a display 248. The display can include, for example, a liquid crystal display (LCD) panel, an organic light-emitting diode (OLED), a microLED panel, projector device, or any other suitable electronic display technology or display panel. In some embodiments, the display 248 can be configured to present information relating to other components of the watch 100 as images, video, text, or other graphical information. For example, the display 248 can be configured to present an ECG graph, GSR information, a heart rate, or other information gathered with the sensor(s) 244. The various components shown in FIG. 2 can be coupled together or to the processing circuitry 240 via one or more busses, wireless communication links, or other interconnection technologies.

Figure 3:
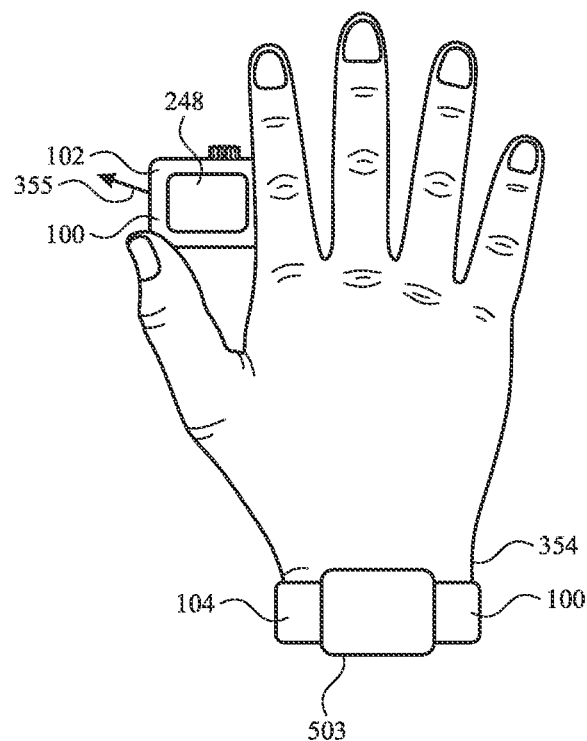
FIG. 3 is an illustration of a watch housing held by a user's hand to take a picture, in accordance with some embodiments.

FIG. 3 shows an example of a usage of a watch 100 having a sensor, such as a camera, in accordance with some embodiments. FIG. 3 shows an example of the watch 100 with a band 104 as it is worn on a user's wrist 354, and with the housing 102 removed or detached from the band 104 during detection with the sensor or picture capture with the camera. The band 104 includes a nest portion 503 upon which the housing 102 containing the camera or sensor can be mounted.

In the example shown in FIG. 3, the watch 100 can include a camera mounted directly or indirectly to the housing 102 and configured to capture a picture of a scene through the bottom side 119 of the housing 102. Release of the attachment mechanism 106 can provide a convenient mechanism for removing the housing 102 from nest portion 503 of the band 104 to take a picture with a bottom-facing camera on the watch housing. A display 248 can be disposed within a top portion of the housing and visible through the top side 117 of the housing 102 to permit the scene to be displayed during or after the picture is captured with the camera. The "top portion" of the housing as used herein refers to any portion in the top half of the housing. The camera can be operatively coupled to one or more input devices, such as the dial 112, the button 114, a touch sensor, an input device disposed on the band 104, and/or any other suitable input device so that the input device can be configured to trigger capture of an image with the camera.

Figure 4:
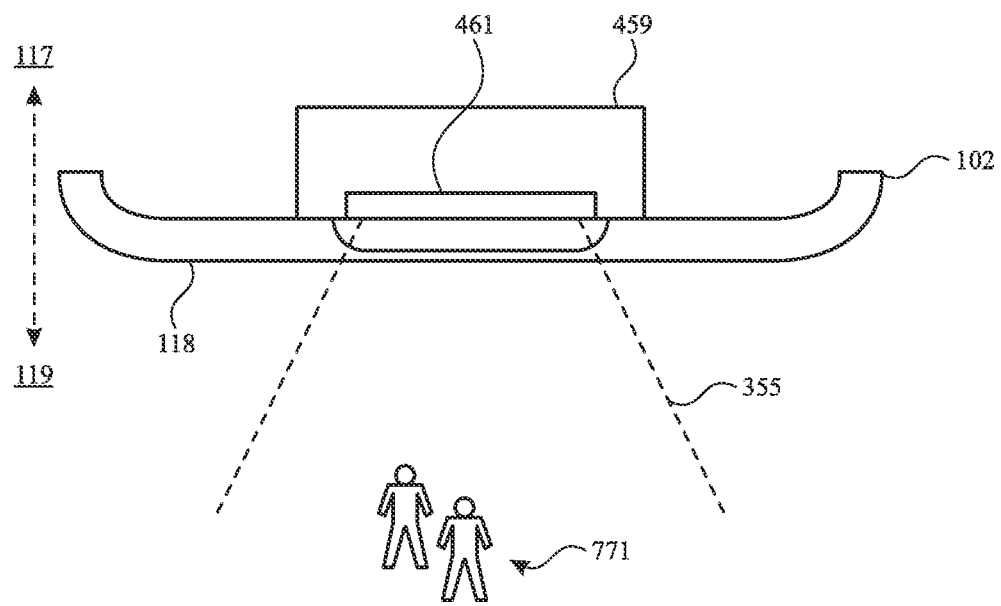
FIG. 4 is a cross section view of a watch having a bottom-facing camera, in accordance with some embodiments.

FIG. 4 shows the example from FIG. 4 in a cross section view. The camera includes an image sensor 459 disposed behind the bottom cover 118 of the housing 102 relative to a field of view (FOV) 355 of the camera and the scene 771 to be captured. The camera has a FOV 355 pointing out the bottom side 119 of the housing 102 so that pictures of a scene 771 may be taken when the housing 102 is removed from the wrist 354. In the illustrated example, the bottom cover 118 is disposed between the image sensor 459 and the scene 771 viewed by the image sensor 459 and the camera. A lens of the camera configured to focus an image onto the image sensor 459 can, for example, be integrated within the bottom cover 118. Additionally or alternatively, all or a portion of the lens can be disposed between the image sensor 459 and the bottom cover 118, or can be configured to protrude from the bottom cover 118, for example The image sensor 459 can, for example, be fixed relative to the housing 102. For example the image sensor 459 can be mounted directly to the housing 102 or indirectly via one or more substrates, frames, brackets, or other mounting components that are fixed to the housing 102.

The image sensor 459 can include, for example, an active photosensitive area having a photodetector array 461 that detects light incident onto the photodetector array 461. The photodetector array 461 can include, for example, a plurality of photodiodes, phototransistors, and/or any other suitable light-sensitive elements. The light sensitive elements can, for example, be arranged in a regular two-dimensional array of pixels that provides for sufficient resolution for capturing a scene or other information of interest. By way of example, photodetector array 461 can include 1 or more megapixels (MP), such as an array having approximately 1 MP, 2 MP, 3 MP, 4 MP, 5 MP, 6 MP, 7 MP, 8 MP, 10 MP, 12 MP, 16 MP, or more. It is contemplated other resolutions and/or pixels densities can be utilized, and the arrangement of the photodetector array 461 can be selected based on considerations such as the desired image resolution, power consumption, and/or information of interest to be captured. The image sensor can be implemented in a silicon die, thin-film transistor substrate, integrated circuit (IC), and/or other suitable electronic component capable of provide active electronic circuitry and/or light-sensitive elements that can optically capturing an image. In some embodiments, the photodetector array 461 can be sensitive to and be configured to capture a full spectrum of visible light to allow for a user to capture images that provide still pictures (photographs) and/or moving pictures (videos) that can substantially replicate the scene as they view them through their human eyes. Additionally or alternatively, the image sensor 459 can be configured to capture any desired wavelength(s) of light in the visible and/or non-visible spectrum (such as infrared and/or ultraviolet wavelengths). For example, invisible light can be captured to provide for object recognition (such as facial recognition), depth sensing capabilities, thermal imaging, and/or other purposes.

While the example has been described with respect to a camera facing or having a field of view pointing out the bottom side 119 of the housing 102, it is contemplated a camera or sensor can be integrated in any other suitable location, such as in or on a crown, a button, the top side of the housing 102, the sidewall 108, or the like. Further, while the example has been described with respect to removal of the housing 102 for image capture with a camera, it is contemplated that it may be advantageous to remove the housing 102 from the wrist 354 for any of a variety of other functions, such as physiological sensing of body parts other than the user's wrist, phone calls, or the like. In addition, while the example shown in FIG. 3 is implemented with a nest portion 503, implementations are also contemplated in which the housing 102 can be removed from the wrist 354 together with the band 104 to take a picture or otherwise interact with an environment with an I/O device on the housing 102.

FIGS. 5-18 show examples of watch 100 having attachment mechanisms 106 implemented with nest-type mechanisms, in accordance with some embodiments. The nest-type mechanisms can include a releasable attachment mechanism that permits the housing 102 to be removed from the wrist 354 while the band 104 remains wrapped around and secured to the user's wrist.

With reference to FIGS. 5-18, the band 104 can include a nest portion 503, and the housing 102 can be configured to mount onto or couple to the nest portion 503. For example, the nest portion 503 can include an upper or top side surface or seat that is configured to contact or mate with a lower surface or bottom side of the housing 102. Additionally or alternatively, the nest portion 503 can be configured to mate with or contact other surfaces of the housing 102, such as a perimeter sidewall portion of the housing 102.

Figure 5:
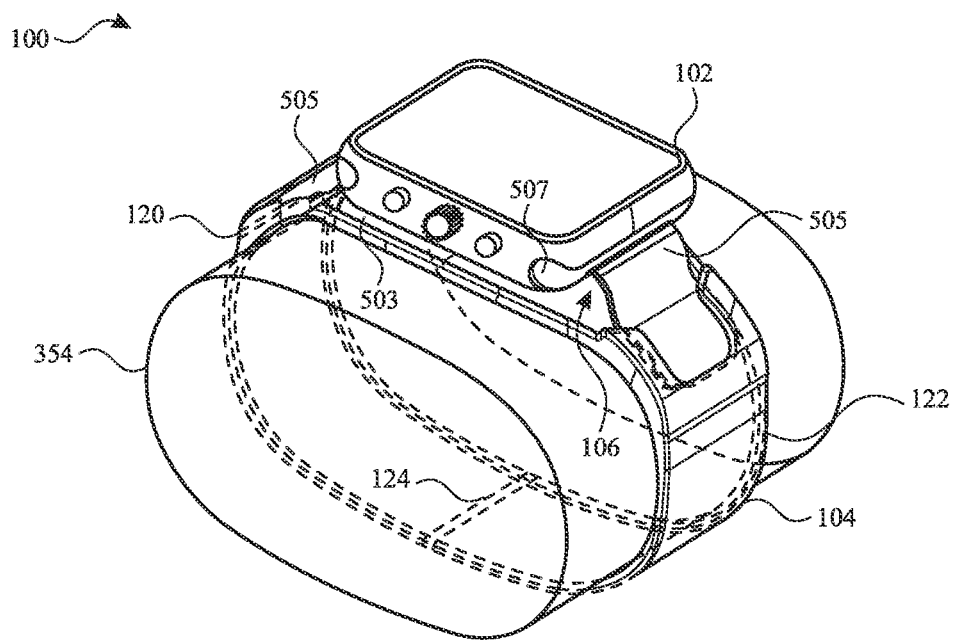
FIG. 5 is a perspective view of a watch having a release mechanism, in accordance with some embodiments.
Figure 6:
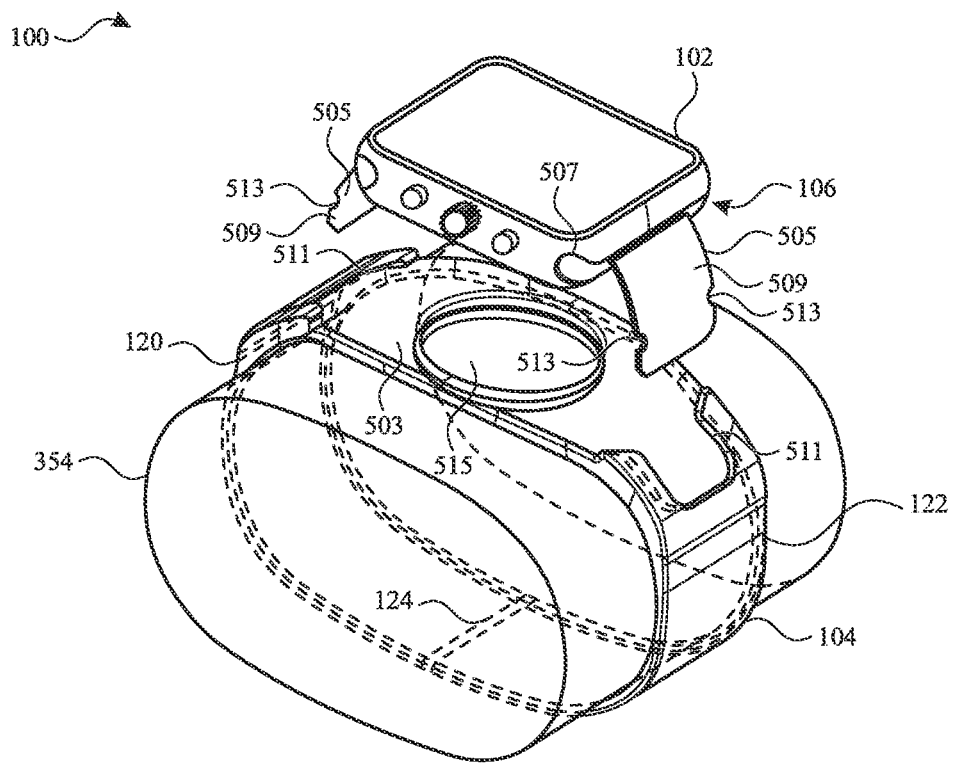
FIG. 6 is a perspective view of the watch of FIG. 5 with a watch housing released from a watch band, in accordance with some embodiments.
Figure 16:
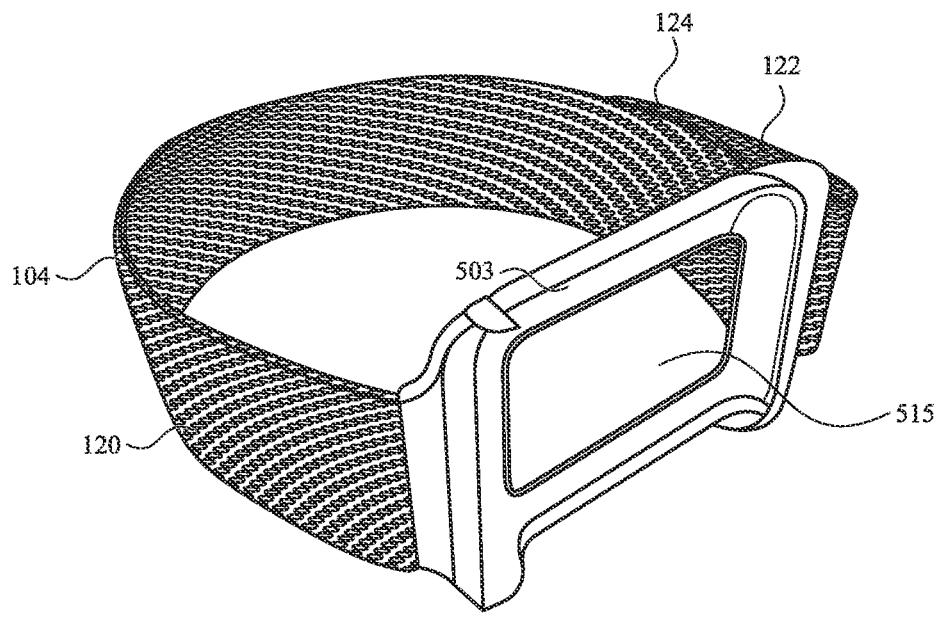
FIG. 16 is a perspective view of a watch band having a nest portion, in accordance with some embodiments.

The nest portion 503 can also provide a portion of the watch band that connects or closes the band 104 in a loop extending circumferentially around the wrist. This portion can, for example as seen in FIGS. 5-6 and 16, be separate from closure mechanism 124 described above. The nest portion 503 can be coupled between the first strap segment 120 and second strap segment 122. For example, an end of the first strap segment 120 can be secured or attached to one side of the nest portion 503, and an end of the second strap segment 122 can be secured or attached to an opposing side of the nest portion 503. The first strap segment 120 can further include another end that is attached to another end of the second strap segment 122. This can allow the closure mechanism 124 to be used to remove the watch band entirely from the wrist, while the nest portion 503 provides a mechanism that permits quick or convenient removal of the housing 102 while the watch band 104 and nest portion 503 remains wrapped around the wrist.

FIGS. 5-8 and 11-12 show examples of watch 100 implemented with an intermediate member 505, which is configured to removably couple to the housing 102 and the band 104. The intermediate member 505 can form a part of the attachment mechanism 106 that interfaces with the housing 102 and the band 104 to permit coupling of the housing 102 to the band 104 via the intermediate member 505. The intermediate member 505 can allow a nest-type mechanism to be integrated with or retrofitted onto an existing watch geometry design of the housing 102 that is otherwise designed to couple to ends of a watch band. For example, the housing 102 may include a pair of slots 507 disposed on opposing sides of the housing 102, with each slot 507 being configured to receive a corresponding lug, bar, or coupling component at the end of a watch strap (e.g., first strap segment 120 or second strap segment 122). The intermediate member 505 can include a lug, a bar, or other coupling component configured for sliding or insertion into slot 507, instead of the end of the watch strap, to thereby provide a removable mechanism that can couple to a nest-type watch band that is configured to remain wrapped around the wrist upon removal of the housing 102 therefrom (for example as shown in FIG. 6).

As used herein, the term "intermediate member" is used to refer to a removable connector component or mechanical member that provides an interface between a watch housing and a watch band, and that can removably couple to an attachment region on a housing and an attachment region on a band without a need for special tools. An "intermediate member" does not necessarily need to provide any electrical interconnections, although it may in some embodiments, such as to provide an electrical connection for data signals and/or power between the watch band and watch housing so that, for example, electronic components in the band can cooperate with electronic components in the housing when coupled together via the intermediate member. Some examples would be a battery in the band configured to recharge a battery in the housing, or an I/O device in the band configured to navigate a display on the housing.

With reference to FIGS. 5-6, an example of watch 100 is shown with an attachment mechanism 106 that is implemented with one or more flexible or compliant tabs 509. Each tab 509 extends from the housing 102 and is configured to couple to the 104 via sliding or insertion of the tab 509 into a corresponding slot 511 of the band 104. More particularly, the example shown in FIGS. 5-6 utilizes a pair of intermediate members 505 inserted into a pair of slots 507 on opposing sides of the housing 102. Each of the intermediate members 505 has a first end having a lug, bar, or coupling components that is inserted into the slot 507 of the housing 102, and a second end having the flexible tab 509 extending therefrom. In this regard, the slot 507 can provide an attachment region on the housing 102, the slot 511 can provide an attachment region on the band 104, and the intermediate member 505 can be configured to removably attach to the respective attachment regions in the housing and the band.

With continued reference to the example of FIGS. 5-6, the attachment mechanism 106 includes retention features for securing or retaining the housing 102 on the nest portion 503. More particularly, the retention features include detent features 513 implemented on the flexible tab 509 of the intermediate member 505. The detent features 513 may lock or click into place within the slot 511 or when aligned with corresponding features that can be included in the slot. The attachment mechanism 106 can, for example, be implemented without a need for a separate button or actuator to release the housing 102 from the nest portion 503 (although it optionally can utilize such an actuator). For example, the detent features 513 may permit the housing 102 to be removed from the band 104 upon application of sufficient force by a free hand other than the hand on the arm containing the wrist 354 wearing the watch 100.

FIG. 6 also shows an example in which the nest portion 503 includes an opening 515. As also seen for example in FIGS. 6, 16, and 18, the opening 515 can be included in the nest portion 503 to provide a void or aperture that permits an optical, acoustic, electrical, or other signal to be transmitted therethrough for sensing of a signal from and/or transmission of a signal onto the wrist 354. Accordingly, the opening 515 may provide a mechanism to provide a continuous watch band loop that extends fully around the circumference of the wrist without occluding other functions such as optical sensing, electrical sensing, or physiological sensing functionality that may be provided while the housing 102 is worn on the wrist.

FIGS. 7-11 show examples of attachment mechanism 106 utilizing a mechanical latch or latch mechanism for retaining the housing 102 onto the nest portion 503, and accordingly, on the wrist 354 when the band 104 is worn on the wrist. The latch mechanism can employ features on the intermediate member 505 or housing 102, and corresponding features on the band 104 or nest portion 503 of the band 104 for latching engagement with each other to secure the housing 102 in place on the band 104. The latch mechanism can also employ an actuation button or other actuator 531 disposed on or otherwise proximate to the housing 102 to permit actuation thereof by a user when the user's free hand is concurrently gripping the housing 102, thereby allowing the latch to be released and housing 102 to be removed using a relatively quick, seamless, or ergonomic motion. The actuator can be operable from an outward-facing surface of the watch 100 to permit actuation thereof by a user while the watch 100 is worn on the wrist.

Figure 7:
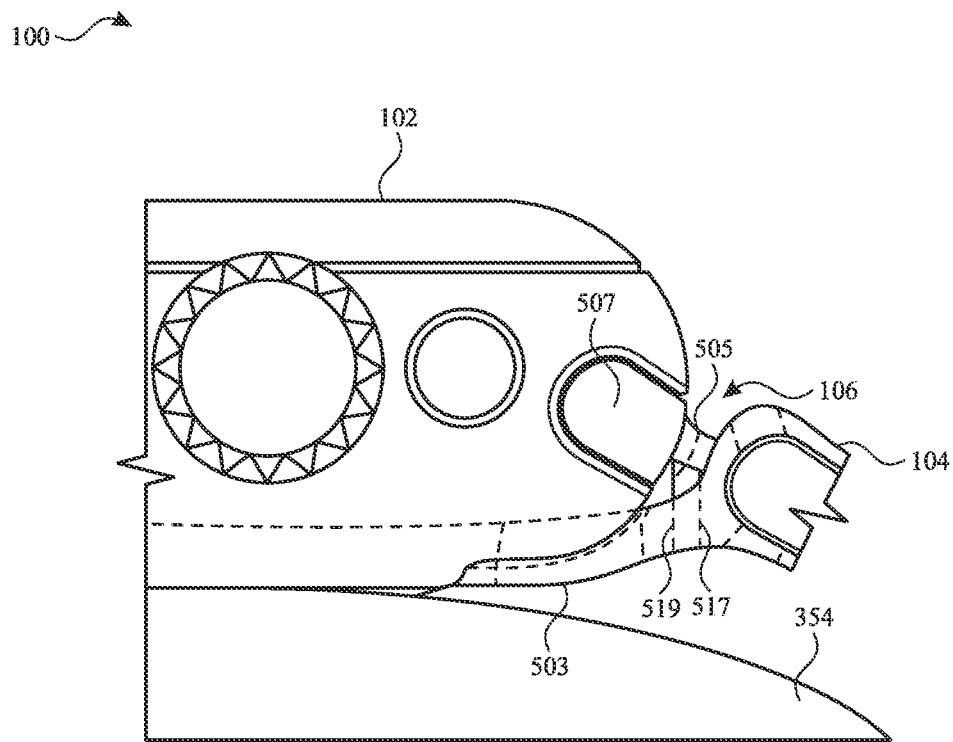
FIG. 7 is a side view of a watch housing coupled to a watch band via an intermediate member, in accordance with some embodiments.
Figure 8:
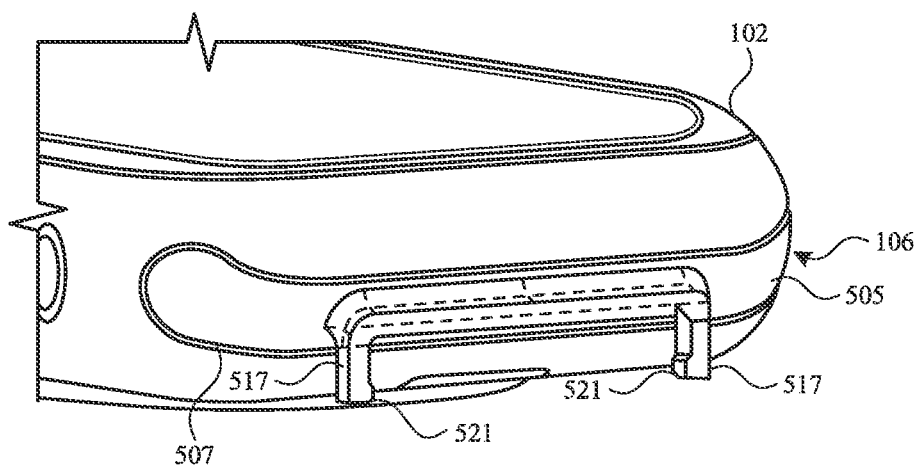
FIG. 8 is a perspective view of the watch housing of FIG. 7 decoupled from the watch band, in accordance with some embodiments.

As seen for example in FIGS. 7-8, the latch mechanism of the attachment mechanism 106 can include latch members 517 extending generally from the housing 102. More particularly, the latch member(s) are shown as a pair of latch arms extending from a second end of the intermediate member 505, opposite to the first end of the intermediate member 505 which contains the bar, lug, or coupling component that is configured to engage the housing slot 507. Each of the latch members 517 includes a latch retention feature 521, such as a hook or protrusion, configured to mate with a corresponding retention feature of the nest portion 503 of the band 104.

Figure 9A:
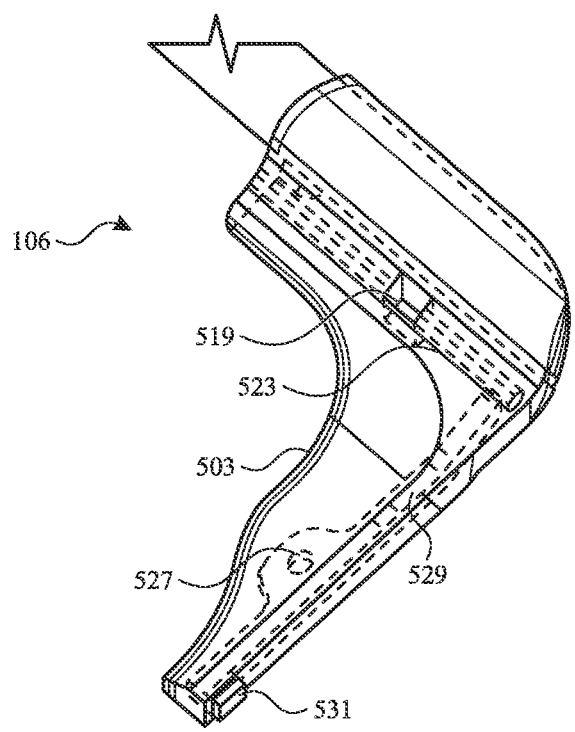
FIGS. 9A-9B are a perspective views of latch mechanisms for a watch, in accordance with some embodiments.
Figure 9B:
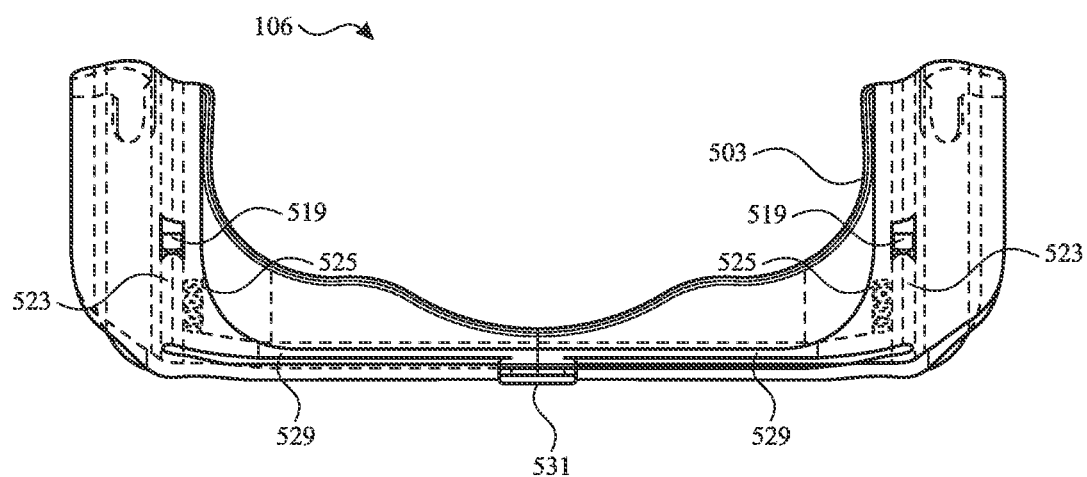
Figure 10:
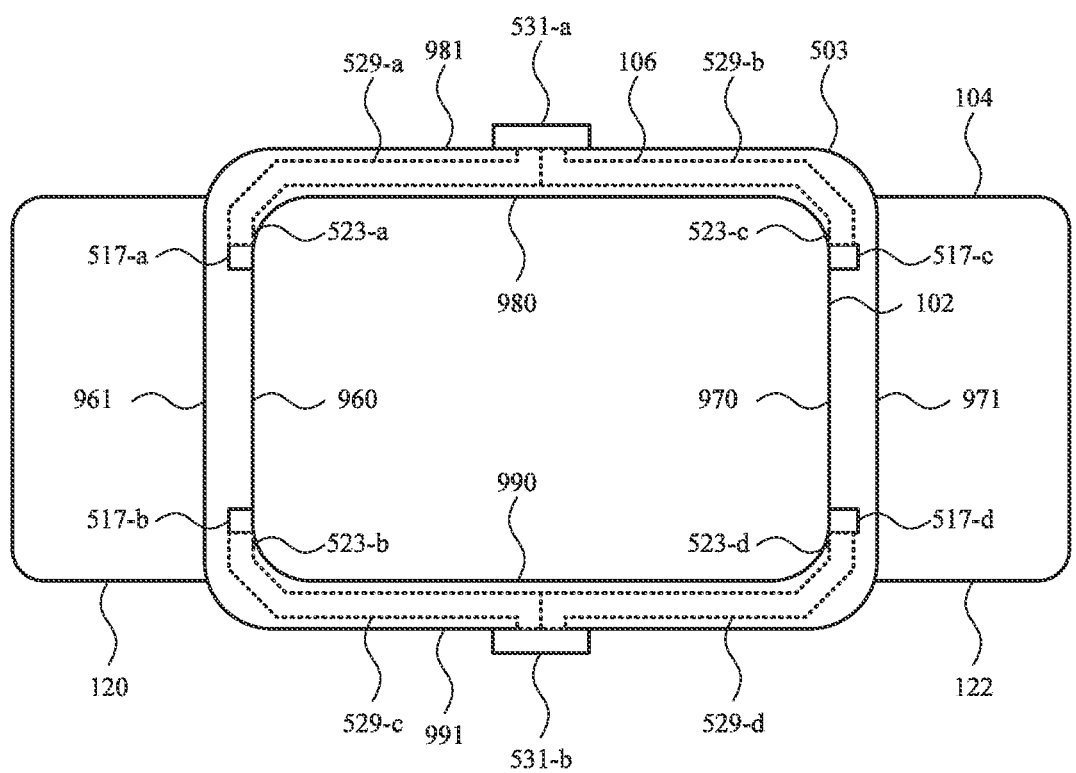
FIG. 10 is a schematic diagram of a latch mechanism for a watch, in accordance with some embodiments.
Figure 11:
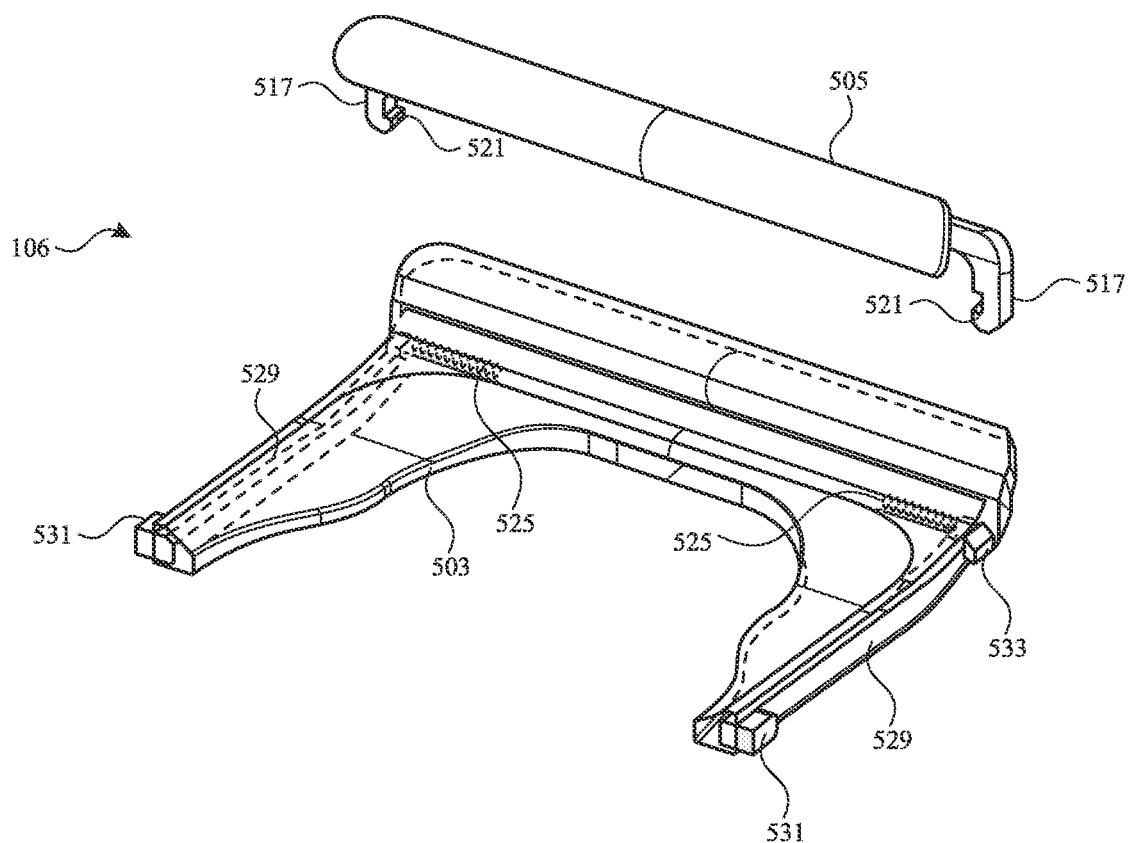
FIG. 11 is a perspective view of a latch mechanism for a watch, in accordance with some embodiments.

FIGS. 9-11 show examples of attachment mechanism 106 in which the mechanism employs an actuator 531 for releasing the housing 102 from the nest portion 503. The actuator 531 can be implemented as an actuation button that operates the latch mechanism via a linkage 529 to convert mechanical motion of the button to movement of one or more engagement members 523. The engagement members 523 are configured to engage with the latch members 517 to releasably secure the housing 102 to the nest portion 503. The engagement members 523 can, for example, include or otherwise cooperate with pins that can be moved or actuated to release the latch members 517. For example, upon depression of the button and movement of the latch pins, the hooks or other engagement features of the latch members 517 can be disengaged to release of the housing 102 from the nest portion 503.

FIG. 9A shows an example where the linkage 529 is implemented as a pivot linkage or pivoting linkage for converting mechanical motion of the actuator 531 into release of the latch. As seen in FIG. 9A, the latch mechanism can include an actuator 531 implemented as or otherwise includes a button, which is coupled to a linkage 529 that rotates about a pivot axis 527. The engagement member 523 includes or is otherwise implemented as a latch pin that engages the latch member 517. Pressing the button can urge movement one end of the linkage 529 to cause the linkage to pivot about the pivot axis 527 so that another end of the linkage 529 engages a cam coupled latch pin to release the latch member 517. FIG. 9A shows only one segment of the mechanism for releasing one of the latch members 517. It is contemplated that the mechanism can include additional like segments, linkages, and/or actuators to cooperate with each other for full release of the housing.

FIG. 9B shows an example where the linkage 529 is implemented as a slider linkage or sliding linkage for actuation of the latch to disengage the latch members 517. FIG. 9B also illustrates the actuator 531 having one button in which actuation of the one button is configured to actuate two opposing linkages on opposing sides of the button, so that multiple latch arms can be concurrently released upon depression of the button. FIG. 9B also shows the latch mechanism implemented with a slider linkage that converts translation of the button into translation of engagement members 523 for release of the latch arms. As seen in FIG. 9B, the latch mechanism can employ biasing elements or springs such as axial springs 525 for biasing the button to an un-pressed position and returning the latch mechanism to an original state.

FIGS. 9A-9B also show an example in which the nest portion 503 includes slots 519. The latch members 517 or latch arms are insertable into the slots 519 to engage with the nest portion 503. It is contemplated, for example as seen in FIG. 11, that the latch arms can additionally or alternatively engage an outer face of the nest portion 503, which case the actuator 531 can release engagement members 523 disposed on or exposed from the outer face.

FIG. 10 is a schematic diagram showing an example of watch 100 in top side plan view, in accordance with some embodiments. In the example shown, attachment mechanism 106 includes multiple actuation buttons and linkages 529, which are configured to cooperate with each other to release the housing 102 from nest portion 503. In this example, the attachment mechanism 106 can be configured in accordance with the examples described above with respect to FIGS. 9A-9B, e.g., with linkages 529 implemented as sliding or pivoting linkages.

Referring to FIG. 10, the housing 102 includes a first side 960, a second side 970, a third side 980, and a fourth side 990. The first side 960 and second side 970 are opposite to each other, and the third side 980 and fourth side 990 are opposite to each other and each adjoin the first side 960 and second side 970. The nest portion 503 also includes a first side 961, a second side 971, a third side 981, and a fourth side 991, with respect to the orientation of the figure. The first side 961 and second side 971 are opposite to each other. The third side 981 and the fourth side 991 are opposite to each other, and each adjoin the first side 961 and the second side 971.

The nest portion 503 is coupled between first strap segment 120 and second strap segment 122. The first side 961 of the nest portion 503 can be connected or attached to the first strap segment 120 so that the first strap segment 120 corresponds to and extends from the first side 961 of the nest portion 503. The second side 971 of the nest portion 503 can be connected or attached to the second strap segment 122 so that the second strap segment 122 corresponds to and extends from the second side 971 of the nest portion 503. The mechanism can include first actuator 531-*a* and second actuator 531-*b* implemented as buttons respectively on the third side 981 and fourth side 991 of the nest portion 503 to permit a user to grip the housing 102 from the third side 980 and fourth side 990 of the housing 102, which are free of the watch strap segment, while concurrently operating the buttons for release of the housing 102 from the nest portion 503.

Referring to FIG. 10 in more detail, a first pair of latch members 517, including latch member 517-*a* and latch member 517-*b*, are disposed on the first side 960 of housing 102, and a second pair of latch members 517, including latch member 517-*c* and latch member 517-*d*, are disposed on the second side 970 of the housing 102. The nest portion 503 includes engagement members 523 that respectively engage with the latch members 517. In particular, a first pair of engagement members 523, including engagement member 523-*a* and engagement member 523-*b* disposed on the first side 961 of the nest portion 503, which are configured to respectively engage with the first pair of latch members 517-*a* and 517-*b*. A second pair of engagement members 523, including engagement member 523-*c* and engagement member 523-*d*, are disposed on the second side 971 of the nest portion 503 and configured to respectively engage with the second pair of latch members 517-*c* and 517-*d*. A first actuator 531-*a* includes a button positioned on the third side 981. This button is coupled to engagement members 523-*a* and 523-*c* respectively via first linkage 529-*a* and second linkage 529-*b*, and is operable to disengage both latch members 517-*a* and 517-*c* upon depression of the button. A second actuator 531-*b* includes a button positioned on the fourth side 991. This button is coupled to engagement members 523-*b* and 523-*d* respectively via third linkage 529-*c* and fourth linkage 529-*d*, and is operable to disengage both latch members 517-*b* and 517-*d*. Upon depressing the buttons generally concurrently, the linkages 529 can convert movement of the buttons to movement of the engagement members 523 and operate to release the latching engagement of the housing 102 while generally permitting a user to maintain a grip on the housing during actuation of the buttons.

Figure 12:
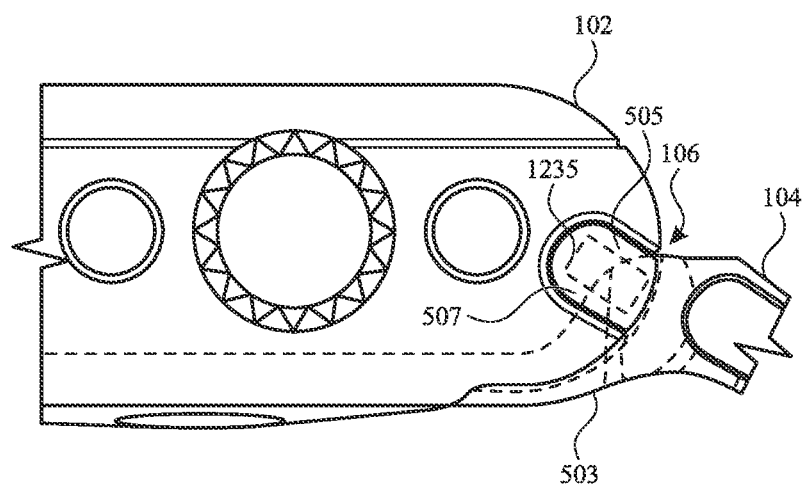
FIG. 12 is a side view of a watch housing coupled to a watch band via a magnetic mechanism, in accordance with some embodiments.

According to some embodiments, a magnet or magnetic mechanism can be utilized to couple the housing 102 to the band 104. FIG. 12 shows an example in which one or more magnets or magnetic elements 1235 provide an attraction force for retaining the housing 102 in the nest portion 503 of the band 104. In the implementation shown, the magnet(s) 1235 is included in the intermediate member 505. The magnet(s) 1235 is configured to mate with a magnetically attractable material (such as a ferromagnetic material or a magnet having an opposite polarity magnet) in the nest portion 503, such as an opposite polarity magnet or a metallic material that is attractable by the magnet(s) 1235 (e.g., types of iron or steel). In the example of FIG. 12, a flush or smooth surface can be provided on or around the housing (e.g., the intermediate member can be implemented without any protruding arms or tabs for retention) to enhance the aesthetic appeal. In some embodiments, the magnetic attachment mechanism can be combined with a latch mechanism or other mechanical attachment mechanism.

Figure 13:
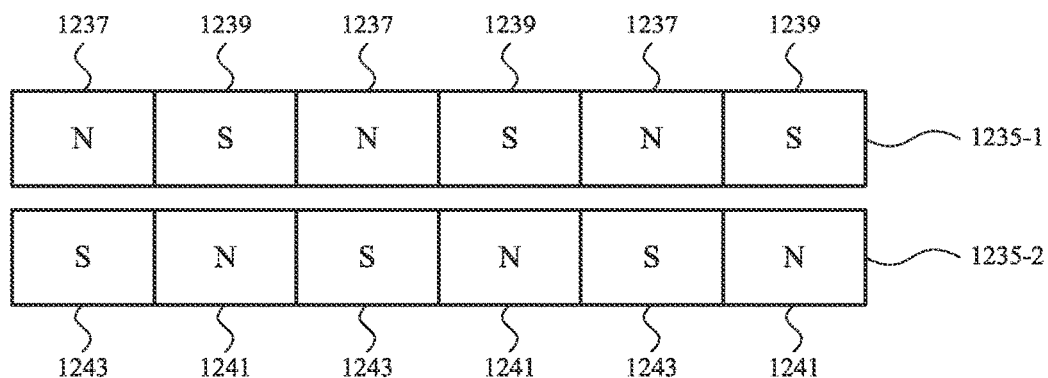
FIG. 13 is a schematic diagram of a magnetic mechanism for a watch, in accordance with some embodiments.
Figure 14:
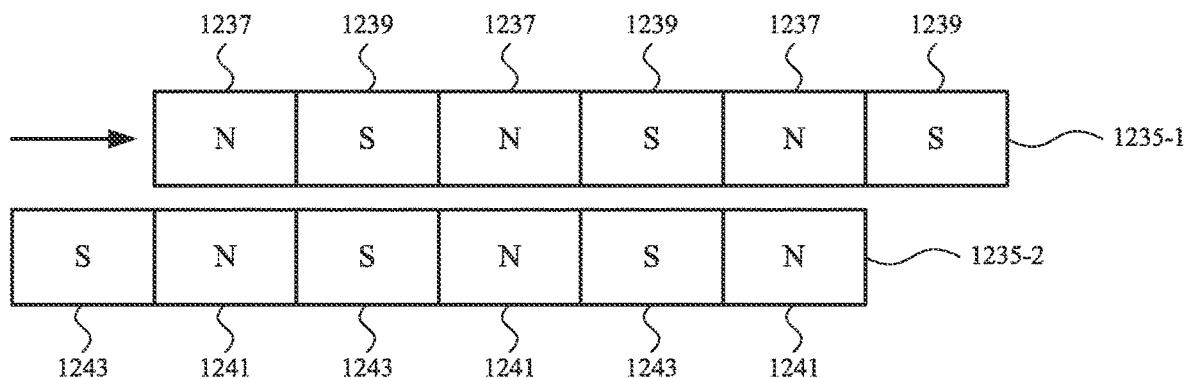
FIG. 14 is a schematic diagram of the magnetic mechanism of FIG. 13 in a release position, in accordance with some embodiments.

According to some embodiments, a magnetic mechanism can be implemented using magnet arrays or otherwise patterned magnetic elements. FIGS. 13 and 14 are schematic diagrams showing an operation of the patterned magnetic elements in coupled configurations and de-coupled configurations, respectively. As seen for example in FIG. 13, a first magnetic element 1235-1 can include an array or pattern of multiple north magnetic poles 1237 and south magnetic poles 1239. The first magnetic element 1235-1 can be configured to mate with a second magnetic element 1235-2 having a corresponding counterpart array or counterpart pattern of multiple north magnetic poles 1241 and south magnetic poles 1243.

As seen in FIG. 13, when the north magnetic poles 1237 of the first magnetic element 1235-1 are aligned with the south magnetic poles 1243 of the second magnetic element 1253-2, and/or when the south magnetic poles 1239 of the first magnetic element 1235-1 are aligned with the north magnetic poles 1241 of the second magnetic element 1253-2, an attraction and retention force is applied between the first magnetic element 1235-1 and the second magnetic element 1235-2 for holding magnetic elements coupled to each other. As seen in FIG. 14, when the north magnetic poles 1237 of the first magnetic element 1235-1 brought out of alignment with the south magnetic poles 1243 of the second magnetic element 1253-2, and/or when the south magnetic poles 1239 of the first magnetic element 1235-1 are brought out of alignment with the north magnetic poles 1241 of the second magnetic element 1253-2, an attraction and retention force is eliminate, changed to a repelling force, or otherwise reduced between the first magnetic element 1235-1 and the second magnetic element 1235-2 for releasing the magnetic elements from each other.

A patterned magnetic attachment mechanism such as that shown in FIGS. 13-14 can be included with the band 104 and housing 102 for coupling the housing 102 to the band 104. For example, the first magnetic element 1235-1 having a first pattern of magnetic poles can be disposed in the intermediate member 505, in the housing 102, or otherwise attached to the housing 102, while the second magnetic element 1235-2 having a second complementary pattern of magnetic poles can be disposed in the nest portion 503, in the band 104, or otherwise attached to the band 104, so that when the first second magnetic elements are brought together the band 104 and the housing 102 are coupled together. It should be noted that while FIGS. 13-14 shows an example of a pattern implemented as a regular one-dimensional array of magnetic poles for the each of the first and second magnetic elements, the magnetic elements can utilize any of a variety of other regular or irregular complementary patterns of magnetic poles arranged in one, two, or three dimensions.

Figure 15:
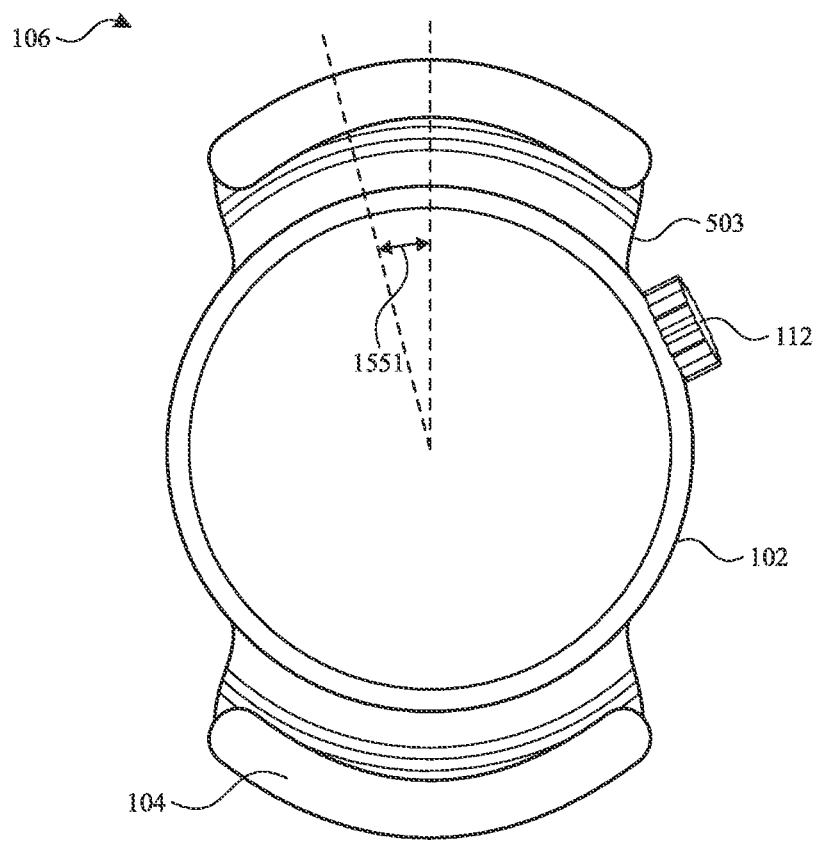
FIG. 15 is a top view of a watch having a partial turn release mechanism, in accordance with some embodiments.

FIG. 15 shows an example of attachment mechanism 106, in accordance with some embodiments. The attachment mechanism 106 includes a release mechanism for decoupling or releasing the housing 102 from the nest portion 503 via rotation of housing 102 with respect to the nest portion 503, about an axis extending generally normal to the top cover or face of the watch. The release mechanism can, for example, be implemented with a patterned magnetic mechanism like that shown in FIGS. 13-14, where rotation of the housing 102 by an angle 1551 causes a magnetic pattern in the housing to be brought out of alignment from a magnetic pattern in the nest portion 503. The mechanism can be configured so that the angle 1551 sufficient to release the housing 102 from the band 104 is, for example, a quarter turn of about 45 degrees, a turn of about 15 degrees, or any feasible angular rotation.

The rotational release mechanism of FIG. 15 can be configured, for example, to be freely operable by a user via gripping of the housing and rotation thereof with a sufficient force to overcome the attraction, without a need to operate a separate actuator. Additionally or alternatively, it is contemplated that the release mechanism can be implemented with a separate button or actuator that, for example, causes the first and second patterned magnetic elements to be rotated, translated, or otherwise moved relative to each other to bring them out of alignment for release of the housing 102. Use of a separate actuator may also, for example, permit a higher magnetic attraction force to be utilized in the magnetic attachment mechanism to reduce a likelihood of inadvertently detaching the housing 102 from the base portion or nest portion 503 (for example, in response to a fall or drop of the watch).

Figure 17:
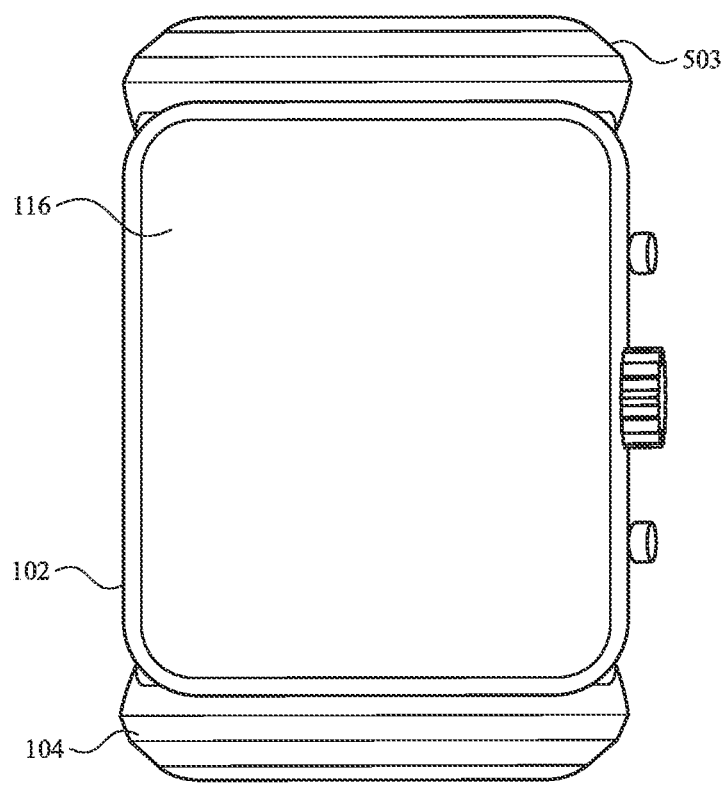
FIG. 17 is a top view of the watch band of FIG. 16 coupled with a watch housing, in accordance with some embodiments.
Figure 18:
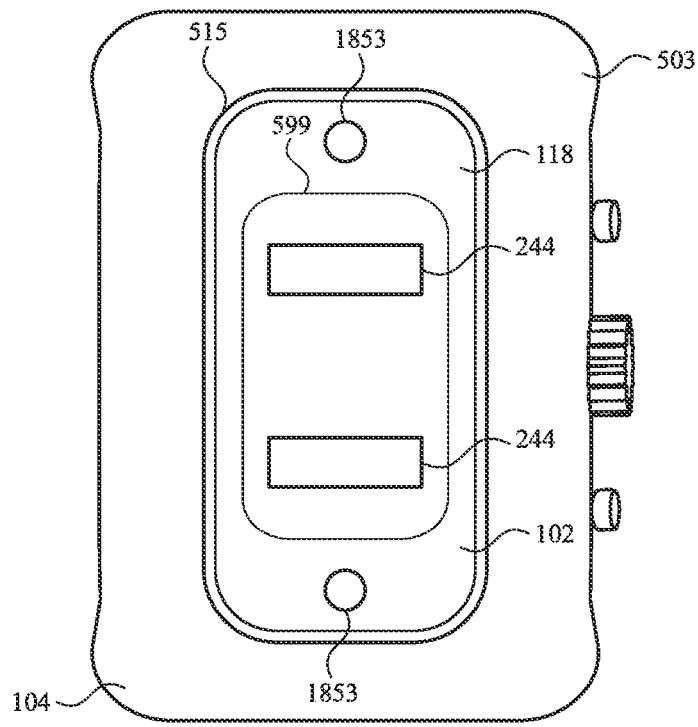
FIG. 18 is a bottom view of the watch band coupled with the watch housing of FIG. 17 coupled with a watch housing, in accordance with some embodiments.
Figure 19:
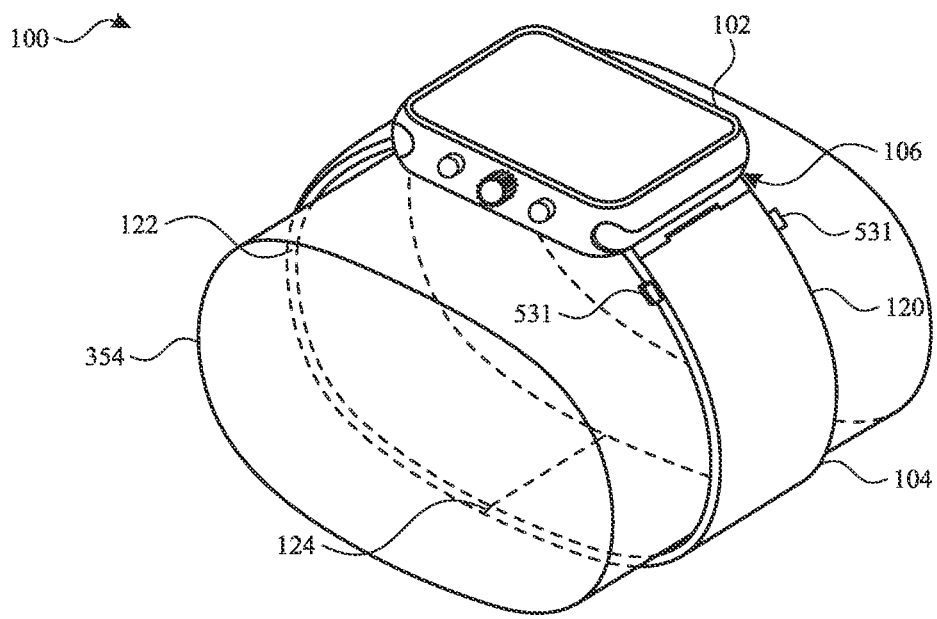
FIG. 19 is a perspective view of a watch having a release mechanism in a closed configuration, in accordance with some embodiments.
Figure 20:
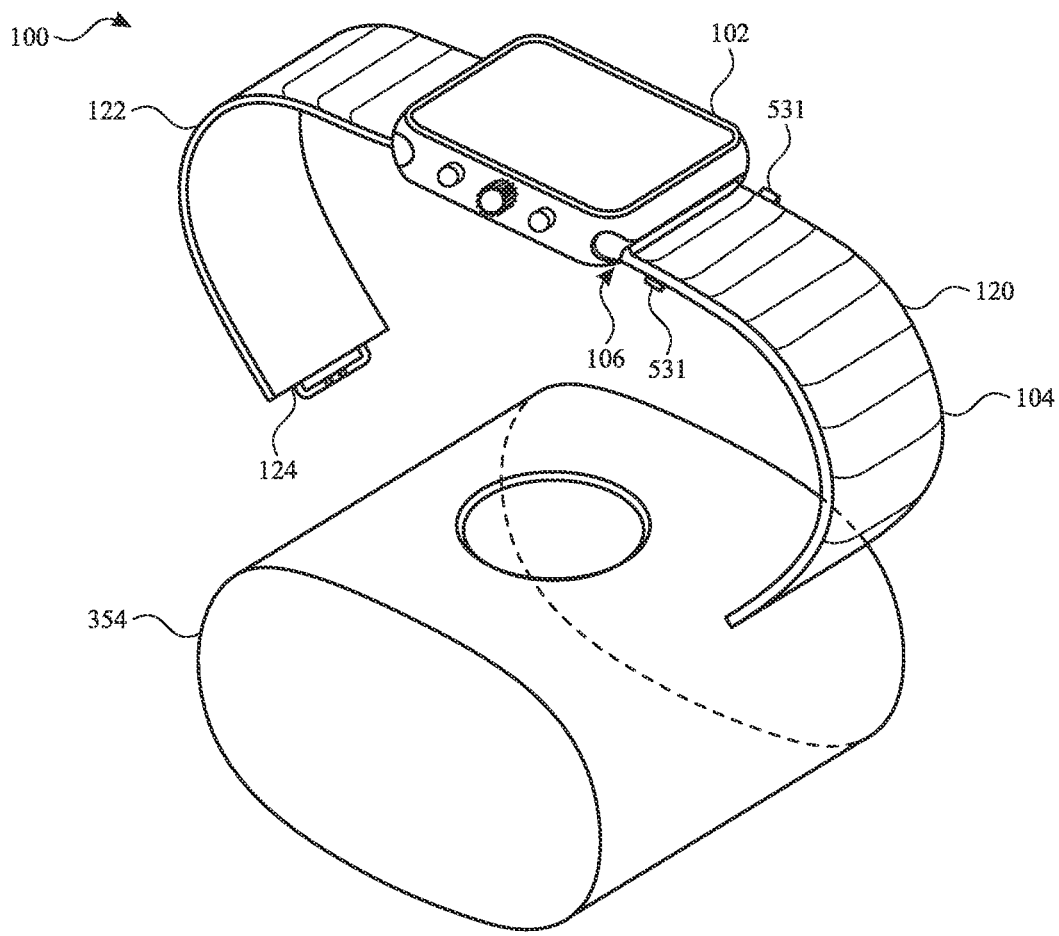
FIG. 20 is a perspective view of the watch of FIG. 19 in an open configuration, in accordance with some embodiments.

FIGS. 16-18 show examples of band 104 implemented with nest portion 503 for receiving the housing 102 of watch 100. FIG. 16 is a perspective view showing the band 104 in a configuration with the housing 102 removed. FIG. 17 is a plan view showing the top side of the nest portion 503 with the housing 102 attached thereto. FIG. 18 is a plan view showing the bottom side of the nest portion 503 with the housing 102 attached thereto.

As seen for example in FIGS. 16 and 17, the nest portion 503 can be implemented with bottom portion and sidewall portion that contacts or couples to the bottom side and sidewall of the housing 102, respectively. In this example, the nest portion 503 is free of any lip, cover, or top portion that is disposed over or on top of the top side 117 of the housing 102 when the housing 102 is coupled to the nest portion 503. Accordingly, such a construction can permit the housing 102 to be released from a top side or upper direction normal to the wrist surface (radially outward from the wrist) and normal to the nest portion and watch band loop. The housing 102 can, for example, be released in this direction upon actuation or operation of any one or more of the release mechanisms described previously. Although the nest portion 503 is shown with both bottom portions and sidewall portions, it is contemplated that the nest portion 503 can be implemented with only bottom side portions or only sidewall portions in various implementations.

As seen for example in FIGS. 16 and 18, the nest portion 503 can include a bottom side opening 515 for permitting a sensor signal to be transmitted therethrough. In FIG. 18, one or more sensors 244 are mounted to a bottom portion of the housing 102 to permit sensing of a wrist through a window 599 on the bottom side of the housing and through opening 515 in the nest portion 503. The "bottom portion" of the housing as used herein refers to any portion in the bottom half of the housing. The sensor(s) 244 can one or more light sources (e.g., light emitting diodes) for emitting light to the wrist through the window 599 and through the opening 515, and one or more light sensors (e.g., photodiodes) for detecting corresponding reflections of the emitted light from the wrist through the window 599 and through the opening 515. This can, for example, allow the nest portion to be positioned between the housing 102 and the wrist while permitting a PPG signal for heart rate monitoring or physiological sensing. Additionally or alternatively, the sensor(s) 244 can include any one or more of the sensors described previously for detecting any appropriate sensing signals through the window 599 of the housing 102 and/or through opening 515 of the nest portion 503. As seen in FIG. 18, opening 515 can be configured to be aligned under or otherwise aligned with the sensor(s) 244 and window 599 when the housing 102 is mated with the nest portion 503.

FIG. 18 also shows an example in which the housing 102 includes one or more bottom-side buttons 1853. The bottom-side button(s) 1853 can be included for actuating the attachment mechanism 106 to, for example, release the intermediate members 505 or watch strap portions from the housing 102, separately from any release mechanism on the top side or outward facing surface of the watch 100 used to release the housing 102 from the nest portion 503.

According to some embodiments, for example as seen in FIGS. 19-22, the actuator 531 can be configured to release the housing 102 from the user's wrist 354 via operation of the closure mechanism 124. This can permit the whole watch to be removed from the wrist including removal of the housing 102 together with the band 104 upon actuation of the mechanism. The watch band 104 can be configured to form a loop around a wrist 354 with the housing 102 on a side of the loop opposite to the closure mechanism 124. The actuator 531 can include a button or other actuation trigger positioning on the same side of the loop as the housing 102, opposite to the closure mechanism. For example, upon pressing the button, the actuator 531 can operate a cable or other component running through the band or around the loop that is coupled to the closure mechanism 124 to release the ends of the first strap segment 120 and the second strap segment 122 from each other.

The first strap segment 120 and the second strap segment 122 can, for example, be implemented as discrete straps with relatively rigid constructions, such as a skeletal structure having a shape memory effect, and/or an outward or open bias so that, upon release of the closure mechanism 124, the first strap segment 120 and second strap segment 122 spread apart to avoid obscuring or occluding a camera or other sensor that can have a FOV facing the bottom side. According to some embodiments, the band 104 or portions thereof can further provide structural support for other functions when removed from the wrist, such as a handle for photo capture.

Figure 21:
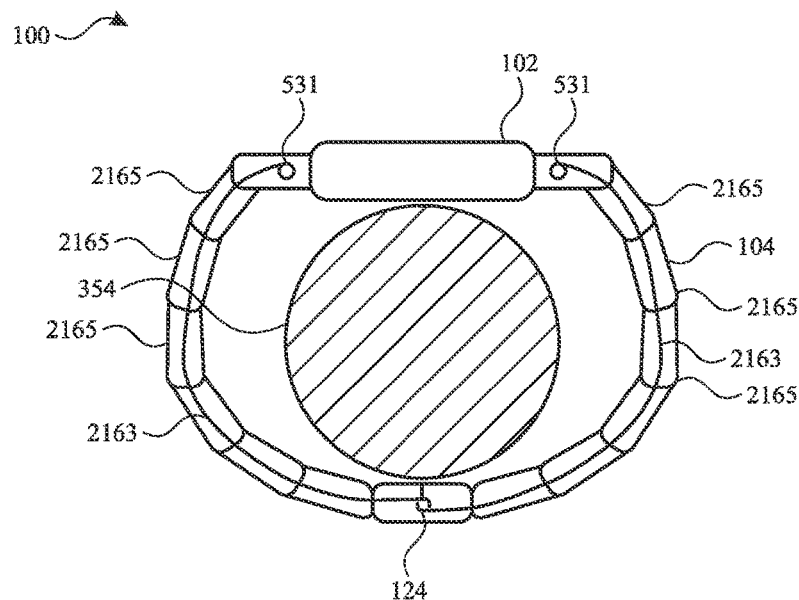
FIG. 21 is a side view of a watch having a release mechanism in a closed configuration, in accordance with some embodiments.
Figure 22:
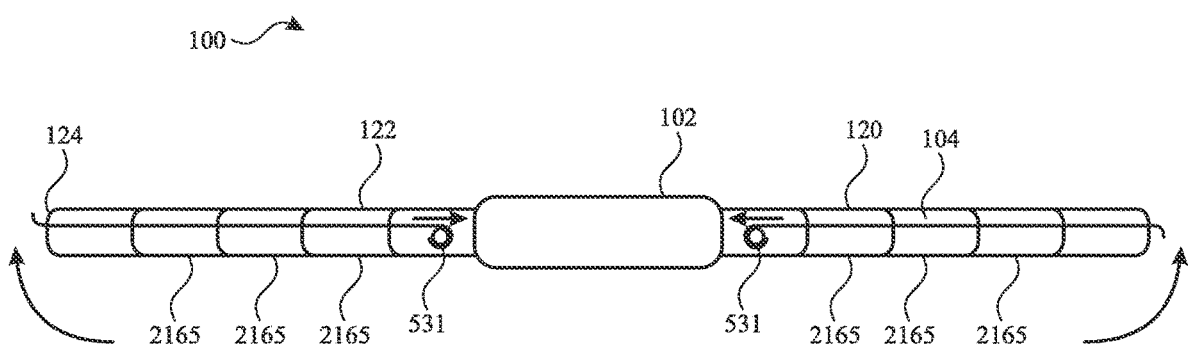
FIG. 22 is a side view of the watch of FIG. 21 in an open configuration, in accordance with some embodiments.

FIGS. 21-22 depict an example of a release mechanism that can be utilized to release closure mechanism 124 to permit the housing 102 to be removed from the wrist. The release mechanism employs a button or other actuator 531 disposed on a same side of the loop as the housing 102 (e.g., on or proximate to the housing), which operates a cable 2163 running through a first strap segment 120 and a second strap segment 122. Each of the first strap segment 120 and the second strap segment 122 may be substantially flexible or conformable to the wrist when the closure mechanism 124 is closed to attached, based on slack in the cable. For example, each of the first strap segment 120 and the second strap segment 122 can be constructed of a series of interconnected link segments 2165 that can articulate relative to one another. Upon actuation of the closure mechanism 124, the cable 2163 can tighten and disconnect the ends of the first and second strap portions from each other. This causes the slack to be removed from the first and second strap portions, making the first and second strap portions more rigid than when in the closed configuration based on tension in the cable, while also pulling the ends of the strap portions apart from one another to avoid occluding or obstructing the FOV of the camera or other sensor pointing out the bottom side of the housing 102.

While various specific examples have been described above, numerous modifications and alternate configurations employing concepts described herein will be apparent to those skilled in the art. For example, while various examples have been described where the housing 102 includes or is attached to one type of mating feature, while the band 104 includes another type of mating features, it will be appreciated that these arrangements can be reversed. Referring to FIGS. 5-6, for example, the arrangement of tabs and slots can be reversed so that the tabs 509 extend from the band 104 while the housing 102 includes slots for receive the tabs 509. As another example, the latch mechanisms of FIGS. 7-11 can be reversed so that latch members 517 extend from the band 104, while the housing 102 and/or intermediate member 505 includes engagement members 523, the actuator 531, and/or linkages 529. Referring to FIG. 12, for example, the magnet 1235 can be included in the nest portion 503 while the intermediate member 505 and/or housing 102 can include a magnetically attractable material (such as a ferromagnetic material or a magnet having an opposite polarity) for attraction to the magnet 1235. Likewise reversed or alternate arrangements are possible for any of the other examples described herein. It is also noted that while specific examples have been described with respect to a removable intermediate member 505, any of the features on the intermediate member 505 for attachment to the band 104 can alternatively be included as a permanent or fixed part of the housing 102 instead of a removable intermediate member.

As described above, one aspect of the present technology is the gathering and use of data available from specific and legitimate sources for photo capture or health monitoring, for example. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users based on aggregated non-personal information data or a bare minimum amount of personal information, such as the content being handled only on the user's device or other non-personal information available to the content delivery services.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112 (f) unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. A watch comprising:
   a housing comprising a display;
   a watch band attachable to the housing, the watch band comprising a first band strap, a second band strap, and a closure mechanism configured to releasably join a first end of the first band strap to a second end of the second band strap to close a loop, wherein the closure mechanism is on a side of the loop that is opposite the housing;
   an actuator operatively coupled to the closure mechanism, wherein the actuator is on a same side of the loop as the housing; and
   a cable extending through the watch band and coupling the actuator to the closure mechanism, the cable being configured to tighten upon operation of the actuator and actuate the closure mechanism to disconnect the first end of the first band strap from the second end of the second band strap.

2. The watch of claim 1, wherein each of the first band strap and the second band strap may be substantially flexible when the closure mechanism is closed, based on slack in the cable.

3. The watch of claim 2, wherein, upon actuation of the actuator, the cable is configured to tighten to remove the slack from the first band strap and the second band strap.

4. The watch of claim 3, wherein the first band strap and the second band strap are biased to extend away from the housing upon the actuation of the actuator.

5. The watch of claim 1, wherein the closure mechanism comprises a magnetic attachment.

6. The watch of claim 1, wherein each of the first band strap and the second band strap comprise multiple interconnected link segments that can articulate relative to one another.

7. The watch of claim 1, wherein the first band strap and the second band strap comprise a shape memory material.

8. A watch comprising:
   a housing comprising a display and a camera on a side of the housing that is opposite the display;
   a watch band attachable to the housing, the watch band comprising a first band strap, a second band strap, and a closure mechanism, the watch band being configured to transition between:
      a first configuration with the closure mechanism joining a first end of the first band strap to a second end of the second band strap so that the watch forms a loop; and
      a second configuration with the first band strap and the second band strap extending away from the housing to be outside a field of view of the camera, the watch band being biased to the second configuration; and
   an actuator operatively coupled to the closure mechanism and configured to actuate the closure mechanism to disconnect the first end of the first band strap from the second end of the second band strap upon operation of the actuator, wherein the actuator is on a same side of the loop as the housing.

9. The watch of claim 8, further comprising a cable extending through the watch band and coupling the actuator to the closure mechanism.

10. The watch of claim 9, wherein, in the first configuration, each of the first band strap and the second band strap may be substantially flexible when the closure mechanism is closed, based on slack in the cable.

11. The watch of claim 10, wherein, in the second configuration, the cable is configured to tighten to remove the slack from the first band strap and the second band strap.

12. The watch of claim 11, wherein the first band strap and the second band strap are each more rigid in the second configuration based on tension in the cable than in the first configuration.

13. The watch of claim 9, further comprising an actuator configured to, upon pressing the actuator, operate the cable to release the first end of the first band strap from the second end of the second band strap.

14. The watch of claim 8, wherein the closure mechanism comprises a magnetic attachment.

15. The watch of claim 8, further comprising a first cable extending through the first band strap and a second cable extending through the second band strap.

16. A watch comprising:
   a housing comprising a display;
   a watch band attachable to the housing, the watch band comprising a first band strap, a second band strap, and a closure mechanism configured to releasably join a first end of the first band strap to a second end of the second band strap to close a loop, wherein the closure mechanism is on a side of the loop that is opposite the housing;
   an actuator operatively coupled to the closure mechanism and configured to actuate the closure mechanism upon operation of the actuator to disconnect the first end of the first band strap from the second end of the second band strap, wherein the actuator is on a same side of the loop as the housing and opposite the closure mechanism.

17. The watch of claim 16, further comprising a cable extending through the watch band and coupling the actuator to the closure mechanism.

18. The watch of claim 17, wherein each of the first band strap and the second band strap may be substantially flexible when the closure mechanism is closed, based on slack in the cable.

19. The watch of claim 18, wherein, upon actuation of the actuator, the cable is configured to tighten to remove the slack from the first band strap and the second band strap.

20. The watch of claim 16, wherein the closure mechanism comprises a magnetic attachment.

* * * * *